No. 647,190. Patented Apr. 10, 1900.
R. LINS & A. GÜNTHER.
PNEUMATIC TIRE.
(Application filed Nov. 29, 1899.)

(No Model.)

Witnesses:

Inventors.
Richard Lins,
Adolf Günther
by
Attorney

UNITED STATES PATENT OFFICE.

RICHARD LINS, OF MAGDEBURG, AND ADOLF GÜNTHER, OF BERLIN, GERMANY.

PNEUMATIC TIRE.

SPECIFICATION forming part of Letters Patent No. 647,190, dated April 10, 1900.

Application filed November 29, 1899. Serial No. 738,707. (No model.)

*To all whom it may concern:*

Be it known that we, RICHARD LINS, a resident of Kaiserstrasse 57ª, Magdeburg, and ADOLF GÜNTHER, a resident of Hochmeisterstrasse 23, Berlin, in the Kingdom of Prussia, Empire of Germany, citizens of the Kingdom of Prussia, have invented certain new and useful Improvements in Pneumatic Tires, of which the following is a specification.

The object of the present invention is an improved pneumatic tire for vehicle-wheels; and the improvement consists in the shape of the tire as well as of the cover, the latter being held the more tightly the stronger the pressure of the air in the tire. Three different forms of tires built on this principle are shown in the accompanying drawings. The three of them show two grooves running along the upper surface of the tire, while two corresponding ribs are exhibited on the inner side of the tire-cover. The grooves, as well as the ribs, slightly converge toward the center of the tire. On the tire being inflated the internal pressure causes the part of the tire lying between the ribs of the cover to expand and by aid of its shape to make a slipping off of the cover a matter of impossibility.

Figure 1:
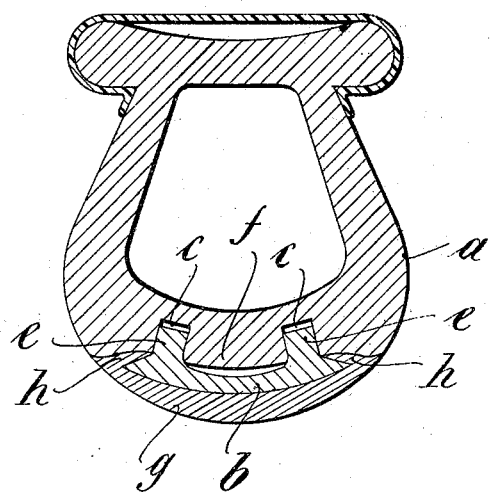

The tire $a$ (shown in Figure 1) has the shape of an ordinary motor-car tire. The upper surface is excavated to give room for the cover $b$ and shows the two converging grooves $c$, mentioned before. The cover consists of any suitable material (leather) and fills the excavation in the running surface. Two ribs $e$ fit in the grooves $c$ of the tire, the former being a little shorter than the latter, thus leaving a sort of air-cushion between them. The part $f$ of the tire lying between the ribs $e$ is equally shorter than the groove formed in the cover. On the tire being inflated $f$ is firmly pressed against the walls of this groove, and the weight of the vehicle increasing the pressure drives this part of the tire even more firmly between the ribs $e$ of the cover. By covering the cover $b$ with a second cover $g$ of india-rubber, linoleum, or another elastic material the durability of cover $b$ is greatly increased. To fasten the second cover $g$ more firmly, its sides $h$ may be made to embrace the inner cover $b$, as shown in the drawings.

Figure 2:
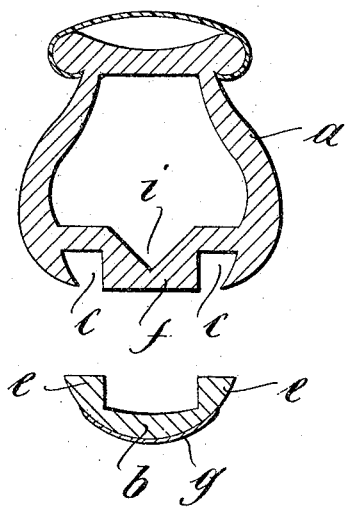
Figure 3:
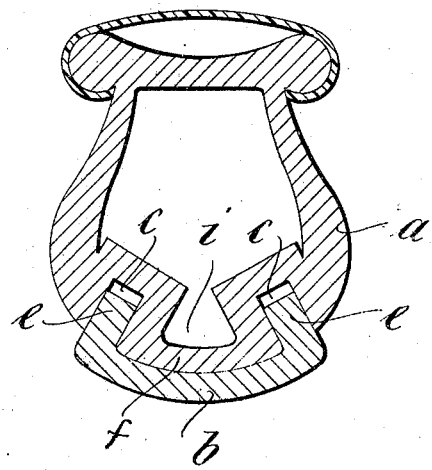

Figs. 2 and 3 represent two altered forms of tires constructed on this principle. They are to be used for lighter vehicles—for instance, light motor-cars and bicycles. They differ in shape from the tire shown in Fig. 1, insomuch as the part $f$ of the tire $a$ between the ribs $e$ of the cover $b$ is considerably weakened to allow of being expanded by a lesser amount of pressure. The tire shown in Fig. 2 has an internal groove $i$ cut out of the part $f$ of the tire, while the ribs $e$ of the cover $b$ and the internal grooves $c$ of the tire are of a shape slightly different from those already described. The comparative thickness of the gripping part $f$ of the tire causes a firm hold on the cover even with a rather low pressure. The third modification, as shown in Fig. 3, has two grooves $c$ converging strongly toward the inner side of the tire, the ribs $e$ of the cover being bent accordingly. Here the part $f$ of the tire lying between these ribs is excavated internally in form of a triangle $i$, this latter forming a sort of air-chamber for itself. It is unnecessary to state that a cover and a tire thus shaped will not be separated even by a severe shock, and the pressure needed to make them practically inseparable may be a very light one.

Having thus described the nature of our invention, what we claim as new is—

1. In a pneumatic tire, the tire $a$ provided with the internal grooves $i$, and the two external grooves $c$, combined with a covering $b$ applied to the outer side of the tire, and which is provided with the ribs $e$ to fit in the grooves $c$, substantially as specified.

2. A pneumatic tire provided upon its inner side with a groove $i$ and with the two grooves $c$ in its outer surface, said outer surface being shaped so as to receive the covering, combined with a covering having ribs $e$ to fit in the grooves in the outer surface of the tire, and a second outer covering $g$ applied to the outer side of the covering $b$, substantially as shown.

In testimony whereof we affix our signatures in presence of two witnesses.

RICHARD LINS.
     ADOLF GÜNTHER.

Witnesses:
 WOLDEMAR HAUPT,
 HENRY HASPER.